United States Patent
Oh et al.

(10) Patent No.: US 11,524,972 B2
(45) Date of Patent: *Dec. 13, 2022

(54) NITROGEN-CONTAINING CYCLIC COMPOUND AND COLOR-CHANGING FILM COMPRISING SAME

(71) Applicant: LG CHEM, LTD., Seoul (KR)

(72) Inventors: Hye Mi Oh, Daejeon (KR); Dong Mok Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 427 days.

This patent is subject to a terminal disclaimer.

(21) Appl. No.: 16/599,669

(22) Filed: Oct. 11, 2019

(65) Prior Publication Data

US 2020/0040011 A1     Feb. 6, 2020

Related U.S. Application Data

(63) Continuation-in-part of application No. PCT/KR2018/004349, filed on Apr. 13, 2018.

(30) Foreign Application Priority Data

Apr. 13, 2017    (KR) .................. 10-2017-0048146

(51) Int. Cl.
     *C07F 5/02*          (2006.01)
     *F21V 8/00*          (2006.01)
     *C09K 11/06*        (2006.01)

(52) U.S. Cl.
CPC .............. *C07F 5/022* (2013.01); *C09K 11/06* (2013.01); *G02B 6/005* (2013.01); *C09K 2211/1022* (2013.01); *G02B 6/0031* (2013.01); *G02B 6/0046* (2013.01)

(58) Field of Classification Search
CPC ..................................... C07F 5/022
See application file for complete search history.

(56) References Cited

U.S. PATENT DOCUMENTS

| | | | |
|---|---|---|---|
| 10,544,166 B2 * | 1/2020 | Lee ..................... | C07F 5/022 |
| 10,988,486 B2 * | 4/2021 | Oh ....................... | C07F 5/022 |
| 2015/0098056 A1 | 4/2015 | Harding et al. | |
| 2016/0230960 A1 | 8/2016 | Seo et al. | |
| 2017/0267921 A1 | 9/2017 | Shin et al. | |
| 2018/0179439 A1 | 6/2018 | Umehara et al. | |
| 2019/0263836 A1 | 8/2019 | Oh et al. | |
| 2020/0207788 A1 | 7/2020 | Oh et al. | |

FOREIGN PATENT DOCUMENTS

| | | |
|---|---|---|
| CN | 110869377 A | 3/2020 |
| JP | 2000-019738 A | 1/2000 |
| JP | 2011-241160 A | 12/2011 |
| JP | 2014-527645 A | 10/2014 |
| KR | 10-2016-0094889 A | 8/2016 |
| KR | 10-2017-0037500 A | 4/2017 |
| KR | 10-2018-0013798 A | 2/2018 |
| WO | 2017-002707 A1 | 1/2017 |

OTHER PUBLICATIONS

European Search Report issued for European Patent Application No. 18783781.1 dated Feb. 7, 2020, 8 pages.
International Search Report issued for PCT/KR2018/004349 dated Aug. 1, 2018, 10 pages.
Verbelen, "Radical C-H Alkylation of BODIPY Dyes Using Potassium Trifluoroborates or Boronic Acids", Chem. Eur. J., (2015), 21, 12667-12675.

* cited by examiner

*Primary Examiner* — Golam M Shameem
(74) *Attorney, Agent, or Firm* — Rothwell, Figg, Ernst & Manbeck, P.C.

(57) ABSTRACT

Nitrogen-containing cyclic compounds for color conversion film, and a color conversion film, a backlight unit and a display apparatus including the compound(s).

11 Claims, 1 Drawing Sheet

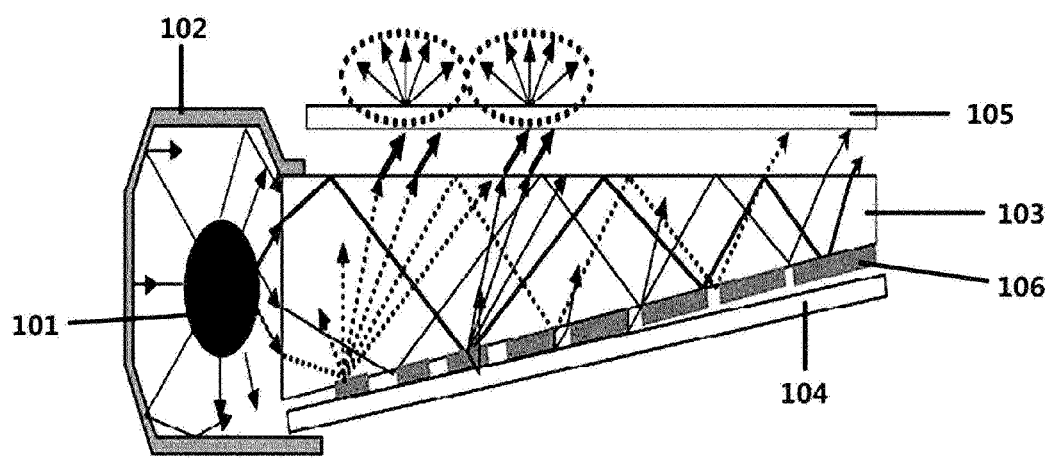

NITROGEN-CONTAINING CYCLIC COMPOUND AND COLOR-CHANGING FILM COMPRISING SAME

The present specification is a continuation-in-part of PCT/KR2018/004349, filed Apr. 13, 2018, which claims priority to and the benefits of Korean Patent Application No. 10-2017-0048146, filed with the Korean Intellectual Property Office on Apr. 13, 2017, the entire contents of which are incorporated herein by reference.

TECHNICAL FIELD

The present specification relates to a nitrogen-containing cyclic compound, and a color conversion film, a backlight unit and a display apparatus including the same.

BACKGROUND ART

Existing light emitting diodes (LED) are obtained by mixing a green phosphorescent substance and a red phosphorescent substance to a blue light emitting diode, or mixing a yellow phosphorescent substance and a blue-green phosphorescent substance to a UV light emitting diode. However, with such a method, it is difficult to control colors, and therefore, color rendering is not favorable. Accordingly, color gamut declines.

In order to overcome such color gamut decline and reduce production costs, methods of obtaining green and red in a manner of filming quantum dots and binding the dots to a blue LED have been recently tried. However, cadmium series quantum dots have safety problems, and other quantum dots have significantly decreased efficiency compared to cadmium series quantum dots. In addition, quantum dots have reduced stability for oxygen and water, and have a disadvantage in that the performance is significantly degraded when aggregated. Furthermore, unit costs of production are high since, when producing quantum dots, maintaining the sizes is difficult.

DISCLOSURE

Technical Problem

The present specification is directed to providing a nitrogen-containing cyclic compound, and a color conversion film, a backlight unit and a display apparatus including the same.

Technical Solution

One embodiment of the present specification provides a compound represented by the following Chemical Formula 1.

[Chemical Formula 1]

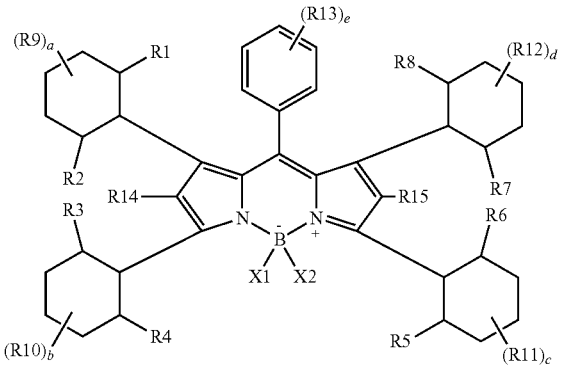

In Chemical Formula 1,

R1 to R8 are each independently hydrogen or a steric hindrance providing group, at least one of R1 to R8 is the steric hindrance providing group, R9 to R13 are each independently hydrogen; deuterium; halogen; a nitrile group; a nitro group; a hydroxyl group; a carboxyl group; an ether group; an ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; or a substituted or unsubstituted heteroaryl group, R14 is a cyano group;

R15 is hydrogen;

a to d are an integer of 0 to 3, e is an integer of 0 to 5, when a to d are 2 or 3, R9 to R12 are each the same as or different from each other, when e is 2 or greater, R13s are the same as or different from each other, and X1 and X2 are each independently a halogen group; a cyano group; a nitro group; an imide group; an amide group; a carbonyl group; an ester group; a substituted or unsubstituted fluoroalkyl group; a substituted or unsubstituted sulfonyl group; a substituted or unsubstituted sulfonamide group; a substituted or unsubstituted alkoxy group; a substituted or unsubstituted aryloxy group; or a substituted or unsubstituted aryl group.

Another embodiment of the present specification provides a color conversion film including a resin matrix; and the compound represented by Chemical Formula 1 dispersed into the resin matrix.

Still another embodiment of the present specification provides a backlight unit including the color conversion film.

Yet another embodiment of the present specification provides a display apparatus including the backlight unit.

Advantageous Effects

A compound according to one embodiment of the present specification is a material having excellent light resistance as well as having high fluorescence efficiency. Accordingly, by using the compound described in the present specification as a fluorescent material of a color conversion film, a color conversion film having excellent luminance and color gamut, and having excellent light resistance can be provided.

DESCRIPTION OF DRAWINGS

FIG. 1 is a mimetic diagram using a color conversion film according to one embodiment of the present specification in a backlight.

MODE FOR DISCLOSURE

Hereinafter, the present specification will be described in more detail.

One embodiment of the present specification provides a compound represented by Chemical Formula 1.

In the present specification, a certain part "including" certain constituents means capable of further including other constituents, and does not exclude other constituents unless particularly stated on the contrary.

In the present specification, one member being placed "on" another member includes not only a case of the one member adjoining the another member but a case of still another member being present between the two members.

Examples of substituents in the present specification are described below, however, the substituents are not limited thereto.

The term "substitution" means a hydrogen atom bonding to a carbon atom of a compound is changed to another substituent, and the position of substitution is not limited as long as it is a position at which the hydrogen atom is substituted, that is, a position at which a substituent can substitute, and when two or more substituents substitute, the two or more substituents may be the same as or different from each other.

The term "substituted or unsubstituted" in the present specification means being substituted with one, two or more substituents selected from the group consisting of deuterium; a halogen group; a nitrile group; a nitro group; an imide group; an amide group; a carbonyl group; a carboxyl group (—COOH); an ether group; an ester group; a hydroxyl group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; and a substituted or unsubstituted heterocyclic group, or being substituted with a substituent linking two or more substituents among the substituents illustrated above, or having no substituents. For example, "a substituent linking two or more substituents" may include a biphenyl group. In other words, a biphenyl group may be an aryl group, or interpreted as a substituent linking two phenyl groups.

In the present specification,

means a site bonding to other substituents or bonding sites.

In the present specification, the halogen group may be fluorine, chlorine, bromine or iodine.

In the present specification, the number of carbon atoms of the imide group is not particularly limited, but is preferably from 1 to 30. Specifically, compounds having structures as below may be included, however, the imide group is not limited thereto.

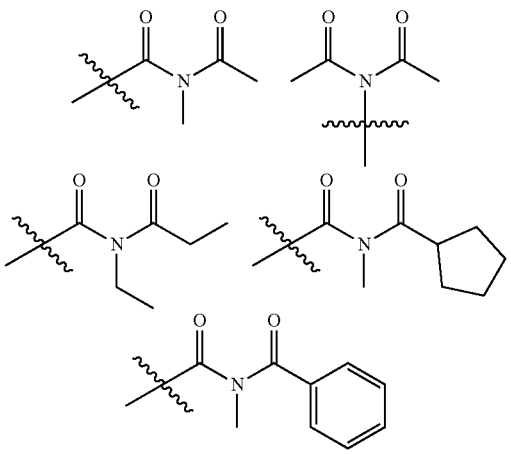

In the present specification, in the amide group, the nitrogen of the amide group may be substituted with hydrogen, a linear, branched or cyclic alkyl group having 1 to 30 carbon atoms or an aryl group having 6 to 30 carbon atoms. Specifically, compounds having the following structural formulae may be included, however, the amide group is not limited thereto.

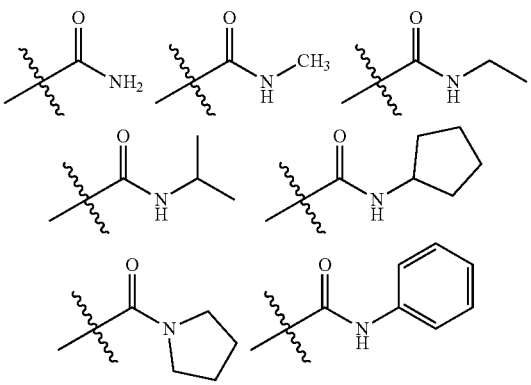

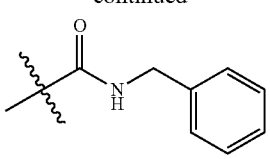

In the present specification, the number of carbon atoms of the carbonyl group is not particularly limited, but is preferably from 1 to 30. Specifically, compounds having structures as below may be included, however, the carbonyl group is not limited thereto.

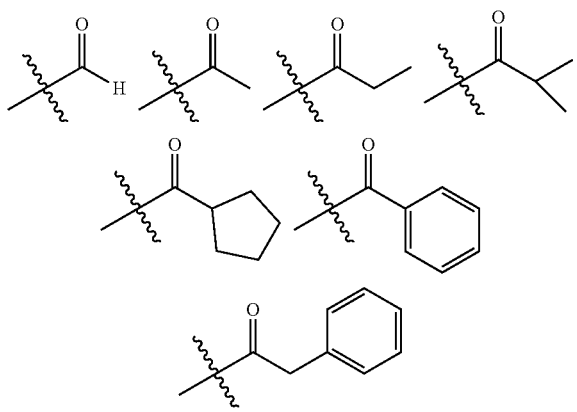

In the present specification, in the ether group, the oxygen of the ether group may be substituted with a linear, branched or cyclic alkyl group having 1 to 25 carbon atoms; or a monocyclic or polycyclic aryl group having 6 to 30 carbon atoms.

In the present specification, in the ester group, the oxygen of the ester group may be substituted with a linear, branched or cyclic alkyl group having 1 to 25 carbon atoms; or a monocyclic or polycyclic aryl group having 6 to 30 carbon atoms. Specifically, compounds having the following structural formulae may be included, however, the ester group is not limited thereto.

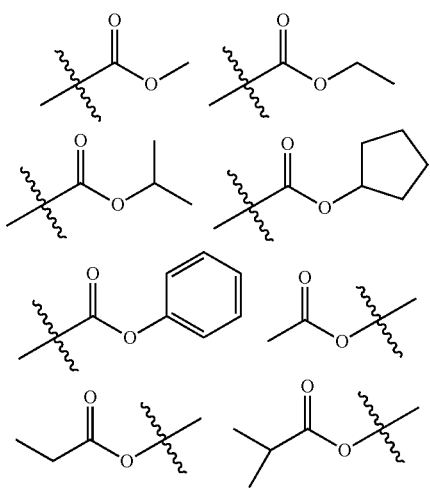

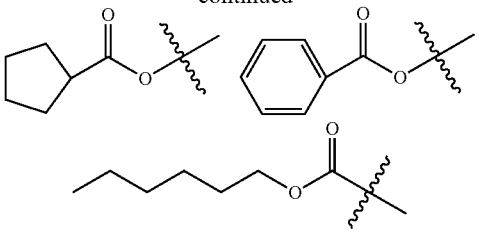

In the present specification, the alkyl group may be linear or branched, and although not particularly limited thereto, the number of carbon atoms is preferably from 1 to 30. Specific examples thereof may include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl and the like, but are not limited thereto.

In the present specification, the cycloalkyl group is not particularly limited, but preferably has 3 to 30 carbon atoms, and specific examples thereof may include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl and the like, but are not limited thereto.

In the present specification, the alkoxy group may be linear, branched or cyclic. The number of carbon atoms of the alkoxy group is not particularly limited, but is preferably from 1 to 30. Specific examples thereof may include methoxy, ethoxy, n-propoxy, isopropoxy, i-propyloxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy, benxyloxy, p-methylbenxyloxy and the like, but are not limited thereto.

In the present specification, the amine group may be selected from the group consisting of —NH$_2$; an alkylamine group; an N-arylalkylamine group; an arylamine group; an N-arylheteroarylamine group; an N-alkylheteroarylamine group and a heteroarylamine group, and although not particularly limited thereto, the number of carbon atoms is preferably from 1 to 30. Specific examples of the amine group may include a methylamine group, a dimethylamine group, an ethylamine group, a diethylamine group, a phenylamine group, a naphthylamine group, a biphenylamine group, an anthracenylamine group, a 9-methyl-anthracenylamine group, a diphenylamine group, an N-phenylnaphthylamine group, a ditolylamine group, an N-phenyltolylamine group, a triphenylamine group and the like, but are not limited thereto.

In the present specification, the N-alkylarylamine group means an amine group in which N of the amine group is substituted with an alkyl group and an aryl group.

In the present specification, the N-arylheteroarylamine group means an amine group in which N of the amine group is substituted with an aryl group and a heteroaryl group.

In the present specification, the N-alkylheteroarylamine group means an amine group in which N of the amine group is substituted with an alkyl group and a heteroaryl group.

In the present specification, the alkyl group in the alkylamine group, the N-alkylarylamine group, the alkylthioxy group, the alkylsulfoxy group and the N-alkylheteroarylamine group is the same as the examples of the alkyl group described above. Specific examples of the alkylthioxy group may include a methylthioxy group, an ethylthioxy group, a tert-butylthioxy group, a hexylthioxy group, an octylthioxy group and the like, and specific examples of the alkylsulfoxy group may include mesyl, an ethylsulfoxy group, a propylsulfoxy group, a butylsulfoxy group and the like, however, the examples are not limited thereto.

In the present specification, the alkenyl group may be linear or branched, and although not particularly limited thereto, the number of carbon atoms is preferably from 2 to 30. Specific examples thereof may include vinyl, 1-propenyl, isopropenyl, 1-butenyl, 2-butenyl, 3-butenyl, 1-pentenyl, 2-pentenyl, 3-pentenyl, 3-methyl-1-butenyl, 1,3-butadienyl, allyl, 1-phenylvinyl-1-yl, 2-phenylvinyl-1-yl, 2,2-diphenylvinyl-1-yl, 2-phenyl-2-(naphthyl-1-yl)vinyl-1-yl, 2,2-bis(diphenyl-1-yl)vinyl-1-yl, a stilbenyl group, a styrenyl group and the like, but are not limited thereto.

In the present specification, specific examples of the silyl group may include a trimethylsilyl group, a triethylsilyl group, a t-butyldimethylsilyl group, a vinyldimethylsilyl group, a propyldimethylsilyl group, a triphenylsilyl group, a diphenylsilyl group, a phenylsilyl group and the like, but are not limited thereto.

In the present specification, the boron group may be —$BR_{100}R_{101}$, and $R_{100}$ and $R_{101}$ are the same as or different from each other and may be each independently selected from the group consisting of hydrogen; deuterium; halogen; a nitrile group; a substituted or unsubstituted monocyclic or polycyclic cycloalkyl group having 3 to 30 carbon atoms; a substituted or unsubstituted linear or branched alkyl group having 1 to 30 carbon atoms; a substituted or unsubstituted monocyclic or polycyclic aryl group having 6 to 30 carbon atoms; and a substituted or unsubstituted monocyclic or polycyclic heteroaryl group having 2 to 30 carbon atoms.

In the present specification, specific examples of the phosphine oxide group may include a diphenylphosphine oxide group, a dinaphthylphosphine oxide group and the like, but are not limited thereto.

In the present specification, the aryl group is not particularly limited, but preferably has 6 to 30 carbon atoms, and the aryl group may be monocyclic or polycyclic.

When the aryl group is a monocyclic aryl group, the number of carbon atoms is not particularly limited, but is preferably from 6 to 30. Specific examples of the monocyclic aryl group may include a phenyl group, a biphenyl group, a terphenyl group and the like, but are not limited thereto.

When the aryl group is a polycyclic aryl group, the number of carbon atoms is not particularly limited, but is preferably from 10 to 30. Specific examples of the polycyclic aryl group may include a naphthyl group, an anthracenyl group, a phenanthryl group, a triphenyl group, a pyrenyl group, a perylenyl group, a chrysenyl group, a fluorenyl group and the like, but are not limited thereto.

In the present specification, the fluorenyl group may be substituted, and adjacent substituents may bond to each other to form a ring.

When the fluorenyl group is substituted,

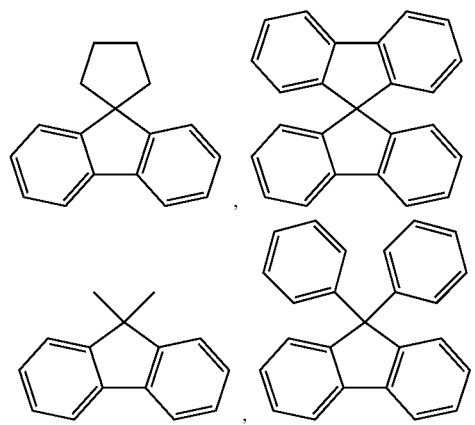

and the like may be included. However, the structure is not limited thereto.

In the present specification, the aryl group in the aryloxy group, the arylthioxy group, the arylsulfoxy group, the N-arylalkylamine group, the N-arylheteroarylamine group and the arylphosphine group may be same as the examples of the aryl group described above. Specific examples of the aryloxy group may include a phenoxy group, a p-tolyloxy group, an m-tolyloxy group, a 3,5-dimethyl-phenoxy group, a 2,4,6-trimethylphenoxy group, a p-tert-butylphenoxy group, a 3-biphenyloxy group, a 4-biphenyloxy group, a 1-naphthyloxy group, a 2-naphthyloxy group, a 4-methyl-1-naphthyloxy group, a 5-methyl-2-naphthyloxy group, a 1-anthryloxy group, a 2-anthryloxy group, a 9-anthryloxy group, a 1-phenanthryloxy group, a 3-phenanthryloxy group, a 9-phenanthryloxy group and the like, and specific examples of the arylthioxy group may include a phenylthioxy group, a 2-methylphenylthioxy group, a 4-tert-butylphenylthioxy group and the like, and specific examples of the arylsulfoxy group may include a benzenesulfoxy group, a p-toluenesulfoxy group and the like, however, the examples are not limited thereto.

In the present specification, examples of the arylamine group include a substituted or unsubstituted monoarylamine group, a substituted or unsubstituted diarylamine group, or a substituted or unsubstituted triarylamine group. The aryl group in the arylamine group may be a monocyclic aryl group or a polycyclic aryl group. The arylamine group including two or more aryl groups may include monocyclic aryl groups, polycyclic aryl groups, or both monocyclic aryl groups and polycyclic aryl groups. For example, the aryl group in the arylamine group may be selected from among the examples of the aryl group described above.

In the present specification, the heteroaryl group is a group including one or more atoms that are not carbon, that is, heteroatoms, and specifically, the heteroatom may include one or more atoms selected from the group consisting of O, N, Se, S and the like. The number of carbon atoms is not particularly limited, but is preferably from 2 to 30, and the heteroaryl group may be monocyclic or polycyclic. Examples of the heterocyclic group may include a thiophene group, a furanyl group, a pyrrole group, an imidazolyl group, a triazolyl group, an oxazolyl group, an oxadiazolyl group, a pyridyl group, a bipyridyl group, a pyrimidyl group, a triazinyl group, a triazolyl group, an acridyl group, a pyridazinyl group, a pyrazinyl group, a qinolinyl group, a quinazolinyl group, a quinoxalinyl group, a phthalazinyl group, a pyridopyrimidyl group, a pyridopyrazinyl group, a pyrazinopyrazinyl group, an isoquinolinyl group, an indolyl group, a carbazolyl group, a benzoxazolyl group, a benzimidazolyl group, a benzothiazolyl group, a benzocarbazolyl group, a benzothiophene group, a dibenzothiophene group, a benzofuranyl group, a phenanthrolinyl group, an isoxazolyl group, a thiadiazolyl group, a phenothiazinyl group, a dibenzofuranyl group and the like, but are not limited thereto.

In the present specification, examples of the heteroarylamine group include a substituted or unsubstituted monoheteroarylamine group, a substituted or unsubstituted diheteroarylamine group, or a substituted or unsubstituted triheteroarylamine group. The heteroarylamine group including two or more heteroaryl groups may include monocyclic heteroaryl groups, polycyclic heteroaryl groups, or both monocyclic heteroaryl groups and polycyclic heteroaryl groups. For example, the heteroaryl group in the heteroarylamine group may be selected from among the examples of the heteroraryl group described above.

In the present specification, examples of the heteroaryl group in the N-arylheteroarylamine group and the N-alkylheteroarylamine group are the same as the examples of the heteroaryl group described above.

In the present specification, the heterocyclic group may be monocyclic or polycyclic, may be aromatic, aliphatic or a fused ring of aromatic and aliphatic, and may be selected from among the examples of the heteroaryl group.

According to one embodiment of the present specification, the steric hindrance providing group is not particularly limited as long as it is capable of enhancing light resistance as an organic fluorescent material by providing steric hindrance to the compound represented by Chemical Formula 1, but may be an isopropyl group, an isobutyl group, a tert-butyl group, an isopentyl group, a neopentyl group, a tert-pentyl group, a cyclopropyl group, a cyclobutyl group, a cyclopentyl group, a cyclohexyl group, a phenyl group, a biphenyl group or the like.

According to one embodiment of the present specification, R1 to R8 are all a steric hindrance providing group.

Although not particularly limited specifically, R1 to R8 may all be a phenyl group as in the following compound.

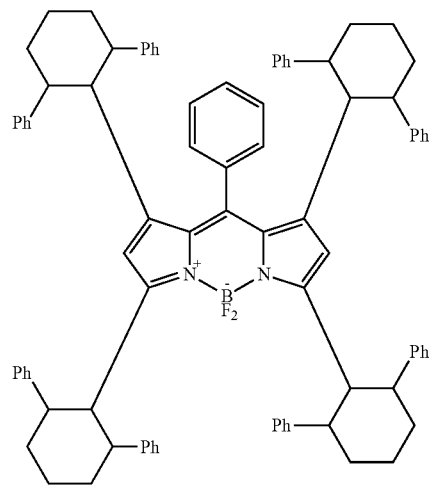

According to one embodiment of the present specification, X1 and X2 are the same as or different from each other, and X1 and X2 are each the same as or different from each other, and each a halogen group, a cyano group, a carbonyl group, an ester group or a substituted or unsubstituted alkoxy group.

According to one embodiment of the present specification, the number of R13 is not particularly limited, and with e being from 1 to 5, substitution may occur on all positions.

According to one embodiment of the present specification, R14 is a cyano group, and R15 is hydrogen.

According to one embodiment of the present specification, in Chemical Formula 1, R2, R4, R6, R8, R9, R10, R11 and R12 are hydrogen, a to e are 1, R1, R3, R5 and R7 are any one selected from among 1A to 102A of the following Table 1, R14, R15, X1 and X2 are any one selected from among 1B to 10B of the following Table 2, and R13 is any one selected from among 1C to 25C of the following Table 3.

TABLE 1

| # | R1 | R3 | R5 | R7 |
|---|---|---|---|---|
| 1A | —CH$_3$ (Cis) | —CH$_3$ (Cis) | —CH$_3$ (Cis) | —CH$_3$ (Cis) |
| 2A | —CH$_3$ (trans) | —CH$_3$ (trans) | —CH$_3$ (trans) | —CH$_3$ (trans) |
| 3A | —CH$_3$ (Cis) | —H | —H | —CH$_3$ (Cis) |
| 4A | —CH$_3$ (trans) | —H | —H | —CH$_3$ (trans) |
| 5A | —CH$_3$ (cis) | —CH$_3$ (cis) | —H | —CH$_3$ (cis) |
| 6A | —CH$_3$ (trans) | —CH$_3$ (trans) | —H | —CH$_3$ (trans) |
| 7A | —H | —CH$_3$ (cis) | —H | —CH$_3$ (cis) |
| 8A | —H | —CH$_3$ (trans) | —H | —CH$_3$ (trans) |
| 9A | —OCH$_3$ (trans) | —OCH$_3$ (trans) | —OCH$_3$ (trans) | —OCH$_3$ (trans) |
| 10A | —OCH$_3$ (cis) | —OCH$_3$ (cis) | —OCH$_3$ (cis) | —OCH$_3$ (cis) |
| 11A | —OCH$_3$ (trans) | —OCH$_3$ (trans) | —H | —OCH$_3$ (trans) |
| 12A | —OCH$_3$ (cis) | —OCH$_3$ (cis) | —H | —OCH$_3$ (cis) |
| 13A | —OCH$_3$ (trans) | —H | —H | —OCH$_3$ (trans) |
| 14A | —OCH$_3$ (cis) | —H | —H | —OCH$_3$ (cis) |
| 15A | —H | —H | —H | —OCH$_3$ (trans) |
| 16A | —H | —H | —H | —OCH$_3$ (cis) |
| 17A | —H | —OCH$_3$ (trans) | —H | —OCH$_3$ (trans) |
| 18A | —H | —OCH$_3$ (cis) | —H | —OCH$_3$ (cis) |
| 19A | —CH$_3$ (cis) | —OCH$_3$ (cis) | —OCH$_3$ (cis) | —CH$_3$ (cis) |
| 20A | —CH$_3$ (trans) | —OCH$_3$ (trans) | —OCH$_3$ (trans) | —CH$_3$ (trans) |
| 21A | —CH$_3$ (cis) | —OCH$_3$ (trans) | —H | —CH$_3$ (cis) |
| 22A | —CH$_3$ (trans) | —OCH$_3$ (trans) | —H | —CH$_3$ (trans |
| 23A | —H | —OCH$_3$ (cis) | —H | —CH$_3$ (cis) |
| 24A | —H | —OCH$_3$ (trans) | —H | —CH$_3$ (trans) |

TABLE 1-continued
| # | R1 | R3 | R5 | R7 |
|---|----|----|----|----|
| 25A | 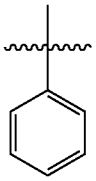 | 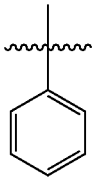 | 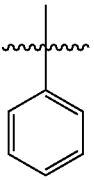 | 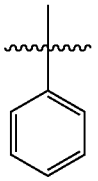 |
| 26A | 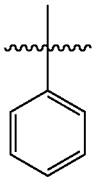 [SMILES: *c1ccccc1] | —H | —H | 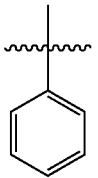 |
| 27A | 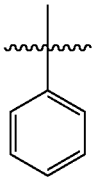 | —H | 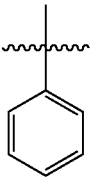 | —H |
| 28A | —H | 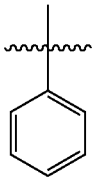 | —H | 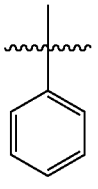 |
| 29A | —H | 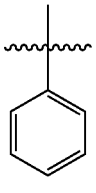 | 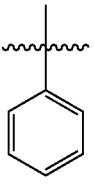 | —H |
| 30A | 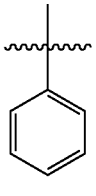 [SMILES: *c1ccccc1] | —CH$_3$ | —CH$_3$ | 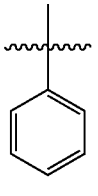 |
| 31A | 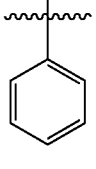 | —CH$_3$ | 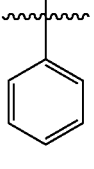 | —CH$_3$ |
| 32A | —CH$_3$ | 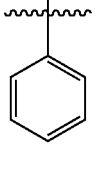 | —CH$_3$ | 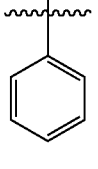 |

TABLE 1-continued

| # | R1 | R3 | R5 | R7 |
|---|----|----|----|----|
| 33A | —CH₃ | 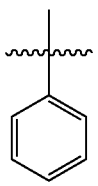 phenyl | 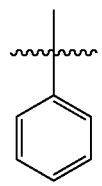 phenyl | —CH₃ |
| 34A | 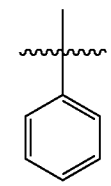 [SMILES: *c1ccccc1] phenyl | —OCH₃ | —OCH₃ | 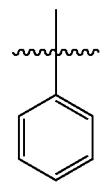 phenyl |
| 35A | 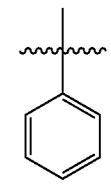 [SMILES: *c1ccccc1] phenyl | —OCH₃ | 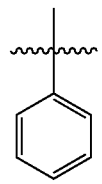 phenyl | —OCH₃ |
| 36A | —OCH₃ | 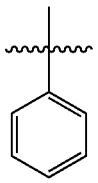 [SMILES: *c1ccccc1] phenyl | —OCH₃ | 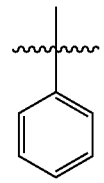 phenyl |
| 37A | —OCH₃ | 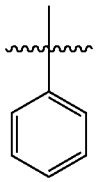 phenyl | 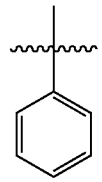 phenyl | —OCH₃ |
| 38A | —C(CH₃)₃ | —C(CH₃)₃ | —C(CH₃)₃ | —C(CH₃)₃ |
| 39A | —C(CH₃)₃ | —H | —H | —C(CH₃)₃ |
| 40A | —C(CH₃)₃ | —H | —C(CH₃)₃ | —H |
| 41A | —H | —C(CH₃)₃ | —H | —C(CH₃)₃ |
| 42A | —H | —C(CH₃)₃ | —C(CH₃)₃ | —H |
| 43A | —C(CH₃)₃ | —CH₃ | —CH₃ | —C(CH₃)₃ |
| 44A | —C(CH₃)₃ | —CH₃ | —C(CH₃)₃ | —CH₃ |
| 45A | —CH₃ | —C(CH₃)₃ | —CH₃ | —C(CH₃)₃ |
| 46A | —CH₃ | —C(CH₃)₃ | —C(CH₃)₃ | —CH₃ |
| 47A | —C(CH₃)₃ | —OCH₃ | —OCH₃ | —C(CH₃)₃ |
| 48A | —C(CH₃)₃ | —OCH₃ | —C(CH₃)₃ | —OCH₃ |
| 49A | —OCH₃ | —C(CH₃)₃ | —OCH₃ | —C(CH₃)₃ |
| 50A | —OCH₃ | —C(CH₃)₃ | —C(CH₃)₃ | —OCH₃ |
| 51A | —CH2CH3 | —CH2CH3 | —CH2CH3 | —CH2CH3 |
| 52A | —CH2CH3 | —H | —H | —CH2CH3 |
| 53A | —CH2CH3 | —H | —CH2CH3 | —H |
| 54A | —H | —CH2CH3 | —H | —CH2CH3 |
| 55A | —H | —CH2CH3 | —CH2CH3 | —H |
| 56A | —CH2CH3 | —CH₃ | —CH₃ | —CH2CH3 |
| 57A | —CH2CH3 | —CH₃ | —CH2CH3 | —CH₃ |
| 58A | —CH₃ | —CH2CH3 | —CH₃ | —CH2CH3 |
| 59A | —CH₃ | —CH2CH3 | —CH2CH3 | —CH₃ |
| 60A | —CH2CH3 | —OCH₃ | —OCH₃ | —CH2CH3 |
| 61A | —CH2CH3 | —OCH₃ | —CH2CH3 | —OCH₃ |
| 62A | —OCH₃ | —CH2CH3 | —OCH₃ | —CH2CH3 |
| 63A | —OCH₃ | —CH2CH3 | —CH2CH3 | —OCH₃ |
| 64A | —CH2CH2CH3 | —CH2CH2CH3 | —CH2CH2CH3 | —CH2CH2CH3 |
| 65A | —CH2CH2CH3 | —H | —H | —CH2CH2CH3 |
| 66A | —CH2CH2CH3 | —H | —CH2CH2CH3 | —H |
| 67A | —H | —CH2CH2CH3 | —H | —CH2CH2CH3 |
| 68A | —H | —CH2CH2CH3 | —CH2CH2CH3 | —H |

TABLE 1-continued

| # | R1 | R3 | R5 | R7 |
|---|---|---|---|---|
| 69A | —CH2CH2CH3 | —CH₃ | —CH₃ | —CH2CH2CH3 |
| 70A | —CH2CH2CH3 | —CH₃ | —CH2CH2CH3 | —CH₃ |
| 71A | —CH₃ | —CH2CH2CH3 | —CH₃ | —CH2CH2CH3 |
| 72A | —CH₃ | —CH2CH2CH3 | —CH2CH2CH3 | —CH₃ |
| 73A | —CH2CH2CH3 | —OCH₃ | —OCH₃ | —CH2CH2CH3 |
| 74A | —CH2CH2CH3 | —OCH₃ | —CH2CH2CH3 | —OCH₃ |
| 75A | —OCH₃ | —CH2CH2CH3 | —OCH₃ | —CH2CH2CH3 |
| 76A | —OCH₃ | —CH2CH2CH3 | —CH2CH2CH | —OCH₃ |
| 77A | —CH(CH3)2 | —CH(CH3)2 | —CH(CH3)2 | —CH(CH3)2 |
| 78A | —CH(CH3)2 | —H | —H | —CH(CH3)2 |
| 79A | —CH(CH3)2 | —H | —CH(CH3)2 | —H |
| 80A | —H | —CH(CH3)2 | —H | —CH(CH3)2 |
| 81A | —H | —CH(CH3)2 | —CH(CH3)2 | —H |
| 82A | —CH(CH3)2 | —CH₃ | —CH₃ | —CH(CH3)2 |
| 83A | —CH(CH3)2 | —CH₃ | —CH(CH3)2 | —CH₃ |
| 84A | —CH₃ | —CH(CH3)2 | —CH₃ | —CH(CH3)2 |
| 85A | —CH₃ | —CH(CH3)2 | —CH(CH3)2 | —CH₃ |
| 86A | —CH(CH3)2 | —OCH₃ | —OCH₃ | —CH(CH3)2 |
| 87A | —CH(CH3)2 | —OCH₃ | —CH(CH3)2 | —OCH₃ |
| 88A | —OCH₃ | —CH(CH3)2 | —OCH₃ | —CH(CH3)2 |
| 89A | —OCH₃ | —CH(CH3)2 | —CH(CH3)2 | —OCH₃ |
| 90A | cyclohexyl | cyclohexyl | cyclohexyl | cyclohexyl |
| 91A | cyclohexyl | —H | —H | cyclohexyl |
| 92A | cyclohexyl | —H | cyclohexyl | —H |
| 93A | —H | cyclohexyl | —H | cyclohexyl |
| 94A | —H | cyclohexyl | cyclohexyl | —H |
| 95A | cyclohexyl | —CH₃ | —CH₃ | cyclohexyl |

TABLE 1-continued

| # | R1 | R3 | R5 | R7 |
|---|---|---|---|---|
| 96A | cyclohexyl | —CH₃ | cyclohexyl | —CH₃ |
| 97A | —CH₃ | cyclohexyl | —CH₃ | cyclohexyl |
| 98A | —CH₃ | cyclohexyl | cyclohexyl | —CH₃ |
| 99A | cyclohexyl | —OCH₃ | —OCH₃ | cyclohexyl |
| 100A | cyclohexyl | —OCH₃ | cyclohexyl | —OCH₃ |
| 101A | —OCH₃ | cyclohexyl | —OCH₃ | cyclohexyl |
| 102A | —OCH₃ | cyclohexyl | cyclohexyl | —OCH₃ |

TABLE 2

| # | R14 | R15 | X1 | X2 |
|---|---|---|---|---|
| 1B | —CN | —H | —F | —F |
| 2B | —CN | —H | —CN | —CN |
| 3B | —CN | —H | —F | —CN |
| 4B | —CN | —H | —NO$_2$ | —NO$_2$ |
| 5B | —CN | —H | —CO$_2$CH$_3$ | —CO$_2$CH$_3$ |
| 6B | —CN | —H | —OCOCH$_3$ | —OCOCH$_3$ |
| 7B | —CN | —H | —CF$_3$ | — |
| 8B | —CN | —H | —SO$_3$ | —SO$_3$ |
| 9B | —CN | —H | —OCH$_3$ | —OCH$_3$ |
| 10B | —CN | —H | —OC$_6$H$_5$ | —OC$_6$H$_5$ |

TABLE 3

| # | R13 |
|---|---|
| 1C | —H |
| 2C | —CN (ortho) |
| 3C | —CN (meta) |
| 4C | —CN (para) |
| 5C | —F (ortho) |
| 6C | —F (meta) |
| 7C | —F (para) |
| 8C | —NO$_2$ (ortho) |
| 9C | —NO$_2$ (meta) |
| 10C | —NO$_2$ (para) |
| 11C | —CO$_2$CH$_3$ (ortho) |
| 12C | —CO$_2$CH$_3$ (meta) |
| 13C | —CO$_2$CH$_3$ (para) |
| 14C | —OMe (ortho) |
| 15C | —OMe (meta) |
| 16C | —OMe (para) |
| 17C | 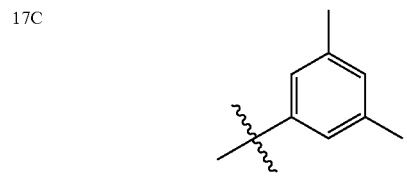 (ortho) |
| 18C | 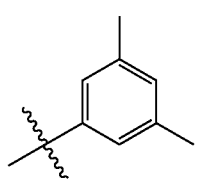 (meta) |
| 19C | 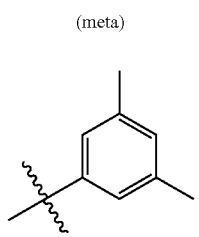 (para) |

TABLE 3-continued

| # | R13 |
|---|---|
| 20C | 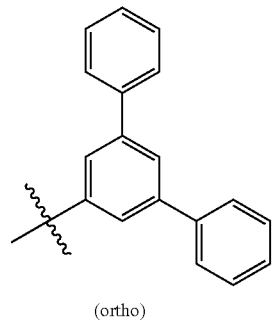 (ortho) |
| 21C | 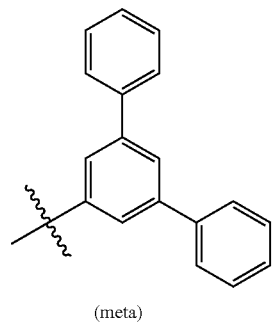 [SMILES: *c1cc(-c2ccccc2)cc(-c2ccccc2)c1] (meta) |
| 22C | 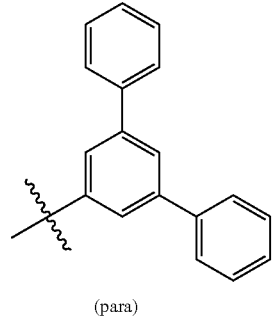 [SMILES: *c1cc(-c2ccccc2)cc(-c2ccccc2)c1] (para) |
| 23C | 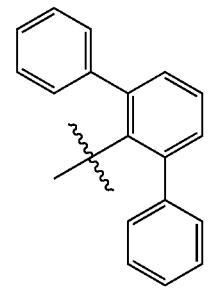 (ortho) |

TABLE 3-continued

| # | R13 |
|---|---|
| 24C | 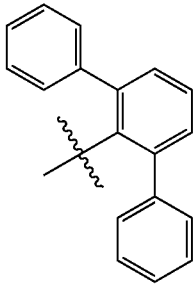 (meta) |
| 25C | 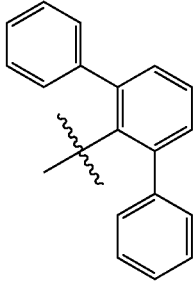 (para) |

One embodiment of the present specification provides a color conversion film including a resin matrix; and the compound represented by Chemical Formula 1 dispersed into the resin matrix.

The content of the compound represented by Chemical Formula 1 in the color conversion film may be in a range of 0.001% by weight to 10% by weight.

The color conversion film may include one type of the compound represented by Chemical Formula 1, or may include two or more types thereof.

The color conversion film may further include additional fluorescent substances in addition to the compound represented by Chemical Formula 1. When using a light source emitting blue light, the color conversion film preferably includes both a green light emitting fluorescent substance and a red light emitting fluorescent substance. In addition, when using a light source emitting blue light and green light, the color conversion film may only include a red light emitting fluorescent substance. However, the color conversion film is not limited thereto, and even when using a light source emitting blue light, the color conversion film may only include a red light emitting compound when a separate film including a green light emitting fluorescent substance is laminated. On the other hand, even when using a light source emitting blue light, the color conversion film may only include a green light emitting compound when a separate film including a red light emitting fluorescent substance is laminated.

The color conversion film may further include a resin matrix; and an additional layer including a compound dispersed into the resin matrix and emitting light in a wavelength different from the wavelength of the compound represented by Chemical Formula 1. The compound emitting light in a wavelength different from the wavelength of the compound represented by Chemical Formula 1 may also be the compound represented by Chemical Formula 1, or may be other known fluorescent materials.

The resin matrix material is preferably a thermoplastic polymer or a thermocurable polymer. Specifically, a poly(meth)acryl-based such as polymethyl methacrylate (PMMA), a polycarbonate (PC)-based, a polystyrene (PS)-based, a polyarylene (PAR)-based, a polyurethane (TPU)-based, a styrene-acrylonitrile (SAN)-based, a polyvinylidene fluoride (PVDF)-based, a modified polyvinylidene fluoride (modified-PVDF)-based and the like may be used as the resin matrix material.

According to one embodiment of the present specification, the color conversion film according to the embodiments described above additionally includes light diffusing particles. By dispersing light diffusing particles into the color conversion film instead of a light diffusing film used in the art for enhancing luminance, higher luminance may be exhibited compared to using a separate light diffusing film, and an adhering process may be skipped as well.

As the light diffusing particles, particles having a high refractive index with the resin matrix may be used, and examples thereof may include $TiO_2$, silica, borosilicate, alumina, sapphire, air or other gases, air- or gas-filled hollow beads or particles (for example, air/gas-filled glass or polymers); polystyrene, polycarbonate, polymethyl methacrylate, acryl, methyl methacrylate, styrene, melamine resin, formaldehyde resin, or polymer particles including melamine and formaldehyde resins, or any suitable combination thereof.

The light diffusing particles may have particle diameters in a range of 0.1 micrometers to 5 micrometers, for example, in a range of 0.3 micrometers to 1 micrometer. The content of the light diffusing particles may be determined as necessary, and for example, may be in a range of approximately 1 part by weight to 30 parts by weight based on 100 parts by weight of the resin matrix.

The color conversion film according to the embodiments described above may have a thickness of 2 micrometers to 200 micrometers. Particularly, the color conversion film may exhibit high luminance even with a small thickness of 2 micrometers to 20 micrometers. This is due to the fact that the content of the fluorescent substance molecules included in the unit volume is higher compared to quantum dots.

The color conversion film according to the embodiments described above may have a substrate provided on one surface. This substrate may function as a support when preparing the color conversion film. Types of the substrate are not particularly limited, and the material or thickness is not limited as long as it is transparent and is capable of functioning as the support. Herein, being transparent means having visible light transmittance of 70% or higher. For example, a PET film may be used as the substrate.

The color conversion film described above may be prepared by coating a resin solution in which the compound represented by Chemical Formula 1 described above is dissolved on a substrate and drying the result, or by extruding and filming the compound represented by Chemical Formula 1 described above together with a resin.

The compound represented by Chemical Formula 1 is dissolved in the resin solution, and therefore, the compound represented by Chemical Formula 1 is uniformly distributed in the solution. This is different from a quantum dot film preparation process that requires a separate dispersion process.

As for the resin solution in which the compound represented by Chemical Formula 1 is dissolved, the preparation method is not particularly limited as long as the compound represented by Chemical Formula 1 and the resin described above are dissolved in the solution.

According to one example, the resin solution in which the compound represented by Chemical Formula 1 is dissolved may be prepared using a method of preparing a first solution by dissolving the compound represented by Chemical Formula 1 in a solvent, preparing a second solution by dissolving a resin in a solvent, and mixing the first solution and the second solution. When mixing the first solution and the second solution, it is preferable that these be uniformly mixed. However, the method is not limited thereto, and a method of simultaneously adding and dissolving the compound represented by Chemical Formula 1 and a resin in a solvent, a method of dissolving the compound represented by Chemical Formula 1 in a solvent and subsequently adding and dissolving a resin, a method of dissolving a resin in a solvent and then subsequently adding and dissolving the compound represented by Chemical Formula 1, and the like, may be used.

As the resin included in the solution, the resin matrix material described above, a monomer curable to this resin matrix resin, or a mixture thereof, may be used. For example, the monomer curable to the resin matrix resin includes a (meth)acryl-based monomer, and this may be formed to a resin matrix material by UV curing. When using such a curable monomer, an initiator required for curing may be further added as necessary.

The solvent is not particularly limited as long as it is capable of being removed by drying afterword while having no adverse effects on the coating process. Non-limiting examples of the solvent may include toluene, xylene, acetone, chloroform, various alcohol-based solvents, methylethyl ketone (MEK), methylisobutyl ketone (MIBK), ethyl acetate (EA), butyl acetate, dimethylformamide (DMF), dimethylacetamide (DMAc), dimethyl sulfoxide (DMSO), N-methyl-pyrrolidone (NMP) and the like, and one type or a mixture of two or more types may be used. When the first solution and the second solution are used, solvents included in each of the solutions may be the same as or different from each other. Even when different types of solvents are used in the first solution and the second solution, these solvents preferably have compatibility so as to be mixed with each other.

The process of coating the resin solution in which the compound represented by Chemical Formula 1 is dissolved on a substrate may use a roll-to-roll process. For example, a process of unwinding a substrate from a substrate-wound roll, coating the resin solution in which the compound represented by Chemical Formula 1 is dissolved on one surface of the substrate, drying the result, and then winding the result again on the roll may be used. When a roll-to-roll process is used, viscosity of the resin solution is preferably determined in a range capable of carrying out the process, and for example, may be determined in a range of 200 cps to 2,000 cps.

As the coating method, various known methods may be used, and for example, a die coater may be used, or various bar coating methods such as a comma coater and a reverse comma coater may be used.

After the coating, a drying process is carried out. The drying process may be carried out under a condition required to remove a solvent. For example, a color conversion film including a fluorescent substance including the compound represented by Chemical Formula 1 having target thickness and concentration may be obtained on a substrate by carrying out the drying in an oven located close to a coater under a condition to sufficiently evaporate a solvent, in a direction of the substrate progressing during the coating process.

When a monomer curable to the resin matrix resin is used as the resin included in the solution, curing, for example, UV curing, may be carried out prior to or at the same time as the drying.

When the compound represented by Chemical Formula 1 is filmed by being extruded with a resin, extrusion methods known in the art may be used, and for example, the color conversion film may be prepared by extruding the compound represented by Chemical Formula 1 with a resin such as a polycarbonate (PC)-based, a poly(meth)acryl-based and a styrene-acrylonitrile (SAN)-based.

According to one embodiment of the present specification, the color conversion film may have a protective film or a barrier film provided on at least one surface. As the protective film or the barrier film, those known in the art may be used.

One embodiment of the present specification provides a backlight unit including the color conversion film described above. The backlight unit may have backlight unit constitutions known in the art except for including the color conversion film. FIG. 1 is a mimetic diagram of a backlight unit structure according to one embodiment. The backlight unit according to FIG. 1 includes a side chain-type light source (101), a reflecting plate (102) surrounding the light source, a light guide plate (103) either directly emitting light from the light source or inducing light reflected from the reflecting plate, a reflective layer (104) provided on one surface of the light guide plate, and a color conversion film (105) provided on a surface of the light guide plate opposite to a surface facing the reflecting plate. A part marked in grey in FIG. 1 is a light dispersion pattern (106) of the light guide plate. Light entering into the light guide plate has non-uniform light distribution due to the repetition of optical processes such as reflection, total-reflection, refraction and transmission, and in order to induce this non-uniform light distribution to uniform brightness, a two-dimensional light dispersion pattern may be used. However, the scope of the present disclosure is not limited to FIG. 1, and a direct type as well as a side chain type may be used as the light source, and the reflecting plate or the reflective layer may not be included or may be replaced with other constituents as necessary, and when necessary, additional films such as a light diffusing film, a light concentrating film and a luminance enhancing film may be further provided.

One embodiment of the present specification provides a display apparatus including the backlight unit. The display apparatus is not particularly limited as long as it includes the backlight unit, and may be included in TVs, computer monitors, laptops, mobile phones and the like.

Preparation of the compound represented by Chemical Formula 1 and an organic light emitting device including the same will be specifically described in the following examples. However, the following examples are for illustrative purposes only, and the scope of the present specification is not limited thereby.

Comparative Example 1

After dissolving 1,3,7,9-tetracyclohexyl-5,5-difluoro-10-phenyl-5H-414,514-dipyrrolo[1,2-c:2',1'-f][1,3,2]diazaborinine (1 g) in methylene chloride, chlorosulfonyl isocyanate (1 mL) was slowly introduced thereto at 0° C., and then the resulting solution was stirred for 1 hour. After the stirring was finished, dimethylformamide (0.49 mL) was introduced thereto, and the result solution was stirred for 1 hour. After the reaction was terminated, the resulting solution was neutralized using a 1 N NaOH solution, and the organic layer was extracted using saturated NaHCO₃ and methylene chloride. The extracted material was concentrated, and column chromatography was used to secure the following Compound 1.

[Compound 1]

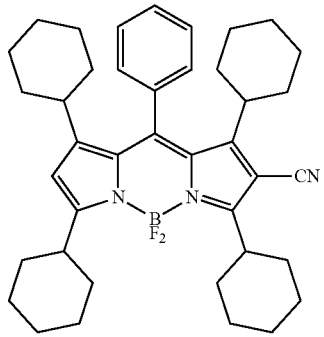

¹H NMR values of the synthesis result are as follows.

¹H NMR (500 MHz, CDCl₃) δ 7.59 (d, J=7.5 Hz, 1H), 7.49 (t, J=7.6 Hz, 2H), 7.36 (d, J=7.3 Hz, 2H), 6.33 (s, 1H), 3.44 (s, 1H), 3.32 (s, 1H), 1.99 (t, J=12.0 Hz, 4H), 1.87 (dd, J=31.7, 15.6 Hz, 8H), 1.80-1.72 (m, 4H), 1.44 (ddd, J=44.8, 27.8, 13.8 Hz, 12H), 1.32-1.21 (m, 6H), 1.12 (d, J=11.9 Hz, 2H), 1.05 (dd, J=25.6, 11.5 Hz, 2H), 0.58 (d, J=12.8 Hz, 2H), 0.49 (d, J=12.9 Hz, 2H).

Method for Preparing Film Using [Compound 1]

The prepared Compound 1 was used in preparing a green light emitting color conversion film. Specifically, Compound 1, a green light emitting material, was added in a 0.4% by weight ratio with respect to 100% by weight of a SAN polymer, and after introducing diffuser particles thereto in a 3% by weight ratio, coating was progressed on a pet film using a solution having approximately 30% solids in a normal butyl acetate solvent to prepare a green light emitting color conversion film. With the prepared green conversion film, a backlight unit of 160 mm×90 mm was manufactured using a blue LED light source. Optical properties were identified in the manufactured backlight unit.

Example 1

Intermediate (1,3,7,9-tetrakis(2-ethylcyclohexyl)-5,5-difluoro-10-phenyl-5H-414,514-dipyrrolo[1,2-c:2',1'-f][1,3,2]diazaborinine) was prepared in the same manner as in the preparation method of Compound 1 of Comparative Example 1 except that potassium 2-ethylcyclohexyl trifluoroborate was used instead of potassium cyclohexyl trifluoroborate, and the following [Compound 2] was prepared in the same manner as in the preparation method of Comparative Example 1 except that Intermediate was used instead of 1,3,7,9-tetracyclohexyl-5,5-difluoro-10-phenyl-5H-414,514-dipyrrolo[1,2-c:2',1'-f][1,3,2]diazaborinine.

[Compound 2]

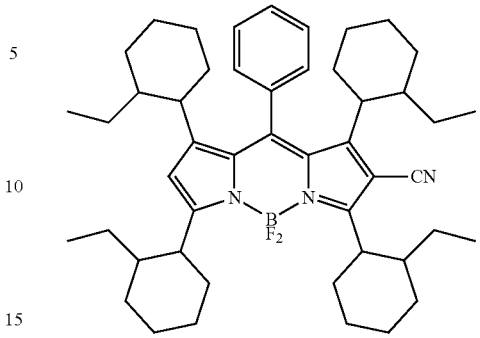

A green light emitting color conversion film and a backlight unit were prepared in the same manner as in Comparative Example 1 except that, using the prepared Compound 2, Compound 2 was used instead of Compound 1. Color conversion was identified from the manufactured backlight unit.

Example 2

Intermediate (5,5-difluoro-10-phenyl-1,3,7,9-tetrakis(2-phenylcyclohexyl)-5H-414,514-dipyrrolo[1,2-c:2',1'-f][1,3,2]diazaborinine) was prepared in the same manner as in the preparation method of [Compound 1] of Comparative Example 1 except that potassium trans-2-phenylcyclohexyl trifluoroborate was used instead of potassium cyclohexyl trifluoroborate, and the following Compound 3 was prepared in the same manner as in the preparation method of Example 1 except that Intermediate was used instead of 1,3,7,9-tetracyclohexyl-5,5-difluoro-10-phenyl-5H-414,514-dipyrrolo[1,2-c:2',1'-f][1,3,2]diazaborinine.

<Compound 3>

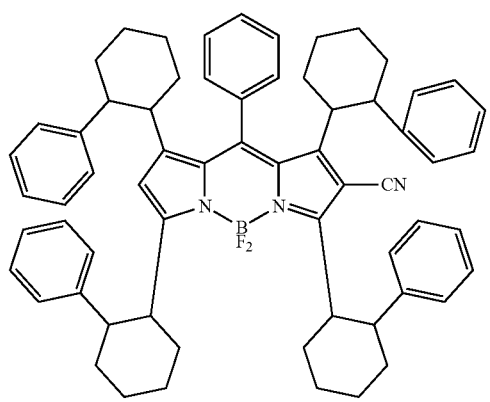

A green light emitting color conversion film and a backlight unit were prepared in the same manner as in Comparative Example 1 except that, using the prepared Compound 3, Compound 3 was used instead of Compound 1. Color conversion was identified from the manufactured backlight unit.

Example 3

Intermediate (5,5-difluoro-1,3,7,9-tetrakis(2-isopropylcyclohexyl)-10-phenyl-5H-414,514-dipyrrolo[1,2-c:2',1'-f][1, 3,2]diazaborinine) was prepared in the same manner as in the preparation method of Compound 1 of Comparative Example 1 except that potassium trans-2-isopropylcyclohexyl trifluoroborate was used instead of potassium cyclohexyl trifluoroborate, and Compound 4 was prepared in the same manner as in the preparation method of Example except that Intermediate was used instead of 1,3,7,9-tetracyclohexyl-5,5-difluoro-10-phenyl-5H-414,514-dipyrrolo[1,2-c:2',1'-f][1,3,2]diazaborinine.

[Compound 4]

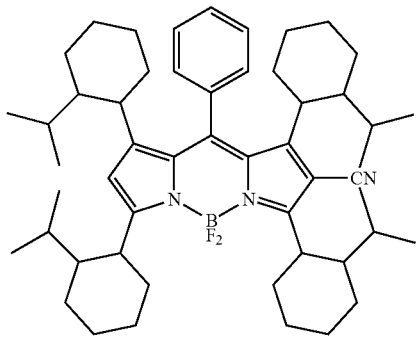

A green light emitting color conversion film and a backlight unit were prepared in the same manner as in Comparative Example 1 except that, using the prepared Compound 4, Compound 4 was used instead of Compound 1. Color conversion was identified from the manufactured backlight unit.

Optical properties of the films prepared in Comparative Example 1, and Examples 1, 2 and 3 are compared and shown in the following Table 4.

TABLE 4

|  |  | Comparative Example 1 | Comparative Example 2 | Example 1 | Example 2 | Example 3 |
|---|---|---|---|---|---|---|
| Maximum Light Emission Intensity | Blue | 0.20 | 0.20 | 0.20 | 0.23 | 0.25 |
|  | Green | 0.19 | 0.20 | 0.18 | 0.15 | 0.16 |
| Maximum Light Emission Wavelength | Green | 533 | 531 | 533 | 542 | 538 |
| Full Width at Half Maximum | Width (nm) | 42 | 43 | 42 | 43 | 44 |
| $Q_Y$ |  | 1.0 | 1.0 | 1.0 | 1.0 | 1.0 |

As seen from Table 4, it was observed that the maximum light emission wavelength was readily controlled as the steric hindrance effect of substituents increased. Light resistance of the films prepared in Comparative Example 1, and Examples 1, 2 and 3 was compared and shown in Table 5. Changes in the amount of green intensity compared to the initial value are described in %.

TABLE 5

|  | % Green Intensity (% Compared to Initial Value) | | | | |
|---|---|---|---|---|---|
| Evaluation Time | Comparative Example 1 | Comparative Example 2 | Example 1 | Example 2 | Example 3 |
| 500 Hours | 89% | 92% | 92% | 92% | 93% |

As seen from Table 5, it was seen that light resistance of the green light emitting color conversion film using the compound according to one embodiment of the present specification was superior compared to the Comparative Example 1.

Comparative Example 2

After dissolving 5,5-difluoro-1,3,7,9-tetrakis(2-methylcyclohexyl)-10-phenyl-5H-414,514-dipyrrolo[1,2-c:2',1'-f][1,3,2]diazaborinine (1 g) in methylene chloride, chlorosulfonyl isocyanate (1 mL) was slowly introduced thereto at 0° C., and then the resulting solution was stirred for 1 hour. After the stirring was finished, dimethylformamide (0.5 mL) was introduced thereto, and the resulting solution was stirred for 1 hour. After the reaction was terminated, the resulting solution was neutralized using a 1 N NaOH solution, and the organic layer was extracted using saturated $NaHCO_3$ and methylene chloride. The extracted material was concentrated, and column chromatography was used to secure the following Compound 5.

[Compound 5]

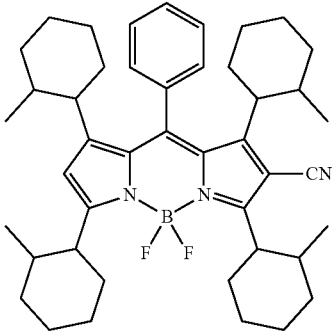

Method for Preparing White Film Using [Compounds 1 to 5]

A green film using the prepared [Compounds 1 to 5] and a film including a red fluorescent substance (maximum absorption wavelength: 581 nm, maximum light emission wavelength: 617 nm) were separately prepared, and laminated to prepare a white film. A light emission spectrum of the prepared film was measured using a spectroradiometer (SR series manufactured by TOPCON TECHNOHOUSE CORPORATION). Specifically, the prepared color conversion film was laminated on one surface of, in a backlight unit including an LED blue backlight (maximum light emission wavelength 450 nm) and a light guide plate, the light guide plate thereof, a prism sheet and a DBEF film were laminated on the color conversion film, and then a spectrum of the film was measured, and color gamut was obtained. The results are shown in Table 6.

TABLE 6

| | Color Gamut (BT709 Area Ratio) | | | | |
|---|---|---|---|---|---|
| | Comparative Example 1 | Comparative Example 2 | Example 1 | Example 2 | Example 3 |
| Based on u'v' (Color Coordinate) | 150.1 | 149.0 | 151.7 | 150.6 | 152.8 |

As seen from Table 6, it was identified that the compound according to one embodiment of the present specification had enhanced color gamut when obtaining a white film compared to the compounds of Comparative Examples 1 and 2.

The invention claimed is:

1. A compound represented by the following Chemical Formula 1:

[Chemcial Formula 1]

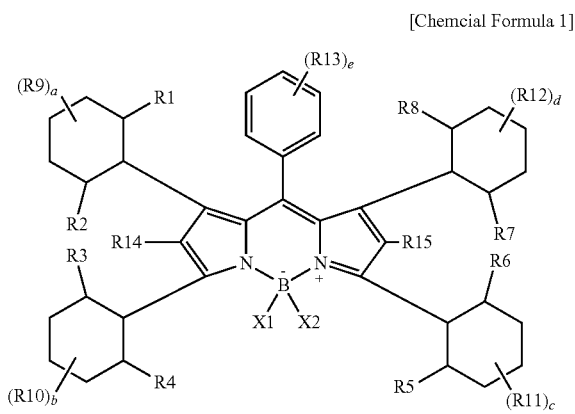

wherein, in Chemical Formula 1,
R1 to R8 are each independently hydrogen or a steric hindrance providing group;
at least one of R1 to R8 is the steric hindrance providing group;
R9 to R13 are each independently hydrogen; deuterium; halogen; a nitrile group; a nitro group; a hydroxyl group; a carboxyl group; an ether group; an ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; or a substituted or unsubstituted heteroaryl group;
R14 is a cyano group;
R15 is hydrogen;
a to d are an integer of 0 to 3;
e is an integer of 0 to 5;
when a to d are 2 or 3, R9 to R12 are each the same as or different from each other;
when e is 2 or greater, R13s are the same as or different from each other; and
X1 and X2 are each independently a halogen group; a cyano group; a nitro group; an imide group; an amide group; a carbonyl group; an ester group; a substituted or unsubstituted fluoroalkyl group; a substituted or unsubstituted sulfonyl group; a substituted or unsubstituted sulfonamide group; a substituted or unsubstituted alkoxy group; a substituted or unsubstituted aryloxy group; or a substituted or unsubstituted aryl group.

2. The compound of claim 1, wherein the steric hindrance providing group is an isopropyl group, an isobutyl group, a tert-butyl group, an isopentyl group, a neopentyl group or a tert-pentyl group.

3. The compound of claim 1, wherein X1 and X2 are the same as or different from each other, and each a halogen group, a cyano group, a carbonyl group, an ester group or a substituted or unsubstituted alkoxy group.

4. The compound of claim 1, wherein R2, R4, R6, R8, R9, R10, R11 and R12 are hydrogen;
a to e are 1;
R1, R3, R5 and R7 are any one selected from among 1A to 102A of the following Table 1;
R14, R15, X1 and X2 are any one selected from among 1B to 7B, 9B and 10B of the following Table 2; and
R13 is any one selected from among 1C to 25C of the following Table 3:

TABLE 1

| # | R1 | R3 | R5 | R7 |
|---|---|---|---|---|
| 1A | —CH₃ (cis) | —CH₃ (cis) | —CH₃ (cis) | —CH₃ (cis) |
| 2A | —CH₃ (trans) | —CH₃ (trans) | —CH₃ (trans) | —CH₃ (trans) |
| 3A | —CH₃ (Cis) | —H | —H | —CH₃ (cis) |
| 4A | —CH₃ (trans) | —H | —H | —CH₃ (trans) |
| 5A | —CH₃ (cis) | —CH₃ (cis) | —H | —CH₃ (cis) |
| 6A | —CH₃ (trans) | —CH₃ (trans) | —H | —CH₃ (trans) |
| 7A | —H | —CH₃ (cis) | —H | —CH₃ (cis) |
| 8A | —H | —CH₃ (trans) | —H | —CH₃ (trans) |
| 9A | —OCH₃ (trans) | —OCH₃ (trans) | —OCH₃ (trans) | —OCH₃ (trans) |
| 10A | —OCH₃ (cis) | —OCH₃ (cis) | —OCH₃ (cis) | —OCH₃ (cis) |
| 11A | —OCH₃ (trans) | —OCH₃ (trans) | —H | —OCH₃ (trans) |
| 12A | —OCH₃ (cis) | —OCH₃ (cis) | —H | —OCH₃ (cis) |
| 13A | —OCH₃ (trans) | —H | —H | —OCH₃ (trans) |
| 14A | —OCH₃ (cis) | —H | —H | —OCH₃ (cis) |
| 15A | —H | —H | —H | —OCH₃ (trans) |
| 16A | —H | —H | —H | —OCH₃ (cis) |
| 17A | —H | —OCH₃ (trans) | —H | —OCH₃ (trans) |
| 18A | —H | —OCH₃ (cis) | —H | —OCH₃ (cis) |
| 19A | —CH₃ (cis) | —OCH₃ (cis) | —OCH₃ (cis) | —CH₃ (cis) |
| 20A | —CH₃ (trans) | —OCH₃ (trans) | —OCH₃ (trans) | —CH₃ (trans) |
| 21A | —CH₃ (cis) | —OCH₃ (trans) | —H | —CH₃ (cis) |
| 22A | —CH₃ (trans) | —OCH₃ (trans) | —H | —CH₃ (trans) |
| 23A | —H | —OCH₃ (cis) | —H | —CH₃ (cis) |
| 24A | —H | —OCH₃ (trans) | —H | —CH₃ (trans) |
| 25A | | | | |
| 26A | | —H | —H | |

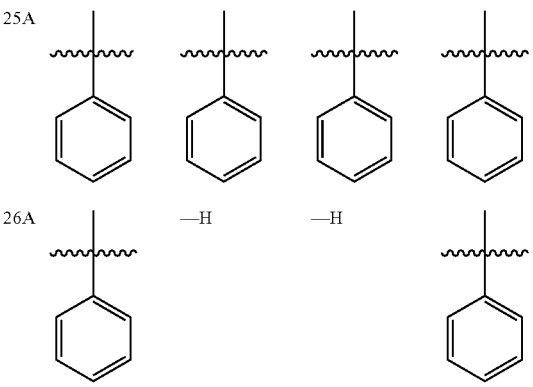

TABLE 1-continued

| # | R1 | R3 | R5 | R7 |
|---|---|---|---|---|
| 27A | Ph | —H | Ph | —H |
| 28A | —H | Ph | —H | Ph |
| 29A | —H | Ph | Ph | —H |
| 30A | Ph | —CH₃ | —CH₃ | Ph |
| 31A | Ph | —CH₃ | Ph | —CH₃ |
| 32A | —CH₃ | Ph | —CH₃ | Ph |
| 33A | —CH₃ | Ph | Ph | —CH₃ |
| 34A | Ph | —OCH₃ | —OCH₃ | Ph |
| 35A | Ph | —OCH₃ | Ph | —OCH₃ |
| 36A | —OCH₃ | Ph | —OCH₃ | Ph |
| 37A | —OCH₃ | Ph | Ph | —OCH₃ |
| 38A | —C(CH₃)₃ | —C(CH₃)₃ | —C(CH₃)₃ | —C(CH₃)₃ |
| 39A | —C(CH₃)₃ | —H | —H | —C(CH₃)₃ |
| 40A | —C(CH₃)₃ | —H | —C(CH₃)₃ | —H |
| 41A | —H | —C(CH₃)₃ | —H | —C(CH₃)₃ |
| 42A | —H | —C(CH₃)₃ | —C(CH₃)₃ | —H |
| 43A | —C(CH₃)₃ | —CH₃ | —CH₃ | —C(CH₃)₃ |
| 44A | —C(CH₃)₃ | —CH₃ | —C(CH₃)₃ | —CH₃ |
| 45A | —CH₃ | —C(CH₃)₃ | —CH₃ | —C(CH₃)₃ |
| 46A | —CH₃ | —C(CH₃)₃ | —C(CH₃)₃ | —CH₃ |
| 47A | —C(CH₃)₃ | —OCH₃ | —OCH₃ | —C(CH₃)₃ |
| 48A | —C(CH₃)₃ | —OCH₃ | —C(CH₃)₃ | —OCH₃ |
| 49A | —OCH₃ | —C(CH₃)₃ | —OCH₃ | —C(CH₃)₃ |
| 50A | —OCH₃ | —C(CH₃)₃ | —C(CH₃)₃ | —OCH₃ |
| 51A | —CH2CH3 | —CH2CH3 | —CH2CH3 | —CH2CH3 |
| 52A | —CH2CH3 | —H | —H | —CH2CH3 |
| 53A | —CH2CH3 | —H | —CH2CH3 | —H |
| 54A | —H | —CH2CH3 | —H | —CH2CH3 |
| 55A | —H | —CH2CH3 | —CH2CH3 | —H |
| 56A | —CH2CH3 | —CH₃ | —CH₃ | —CH2CH3 |
| 57A | —CH2CH3 | —CH₃ | —CH2CH3 | —CH₃ |
| 58A | —CH₃ | —CH2CH3 | —CH₃ | —CH2CH3 |
| 59A | —CH₃ | —CH2CH3 | —CH2CH3 | —CH₃ |
| 60A | —CH2CH3 | —OCH₃ | —OCH₃ | —CH2CH3 |
| 61A | —CH2CH3 | —OCH₃ | —CH2CH3 | —OCH₃ |
| 62A | —OCH₃ | —CH2CH3 | —OCH₃ | —CH2CH3 |
| 63A | —OCH₃ | —CH2CH3 | —CH2CH3 | —OCH₃ |
| 64A | —CH2CH2CH3 | —CH2CH2CH3 | —CH2CH2CH3 | —CH2CH2CH3 |
| 65A | —CH2CH2CH3 | —H | —H | —CH2CH2CH3 |
| 66A | —CH2CH2CH3 | —H | —CH2CH2CH3 | —H |
| 67A | —H | —CH2CH2CH3 | —H | —CH2CH2CH3 |
| 68A | —H | —CH2CH2CH3 | —CH2CH2CH3 | —H |
| 69A | —CH2CH2CH3 | —CH₃ | —CH₃ | —CH2CH2CH3 |
| 70A | —CH2CH2CH3 | —CH₃ | —CH2CH2CH3 | —CH₃ |
| 71A | —CH₃ | —CH2CH2CH3 | —CH₃ | —CH2CH2CH3 |
| 72A | —CH₃ | —CH2CH2CH3 | —CH2CH2CH3 | —CH₃ |
| 73A | —CH2CH2CH3 | —OCH₃ | —OCH₃ | —CH2CH2CH3 |
| 74A | —CH2CH2CH3 | —OCH₃ | —CH2CH2CH3 | —OCH₃ |
| 75A | —OCH₃ | —CH2CH2CH3 | —OCH₃ | —CH2CH2CH3 |
| 76A | —OCH₃ | —CH2CH2CH3 | —CH2CH2CH3 | —OCH₃ |
| 77A | —CH(CH3)2 | —CH(CH3)2 | —CH(CH3)2 | —CH(CH3)2 |
| 78A | —CH(CH3)2 | —H | —H | —CH(CH3)2 |
| 79A | —CH(CH3)2 | —H | —CH(CH3)2 | —H |
| 80A | —H | —CH(CH3)2 | —H | —CH(CH3)2 |
| 81A | —H | —CH(CH3)2 | —CH(CH3)2 | —H |
| 82A | —CH(CH3)2 | —CH₃ | —CH₃ | —CH(CH3)2 |
| 83A | —CH(CH3)2 | —CH₃ | —CH(CH3)2 | —CH₃ |
| 84A | —CH₃ | —CH(CH3)2 | —CH₃ | —CH(CH3)2 |
| 85A | —CH₃ | —CH(CH3)2 | —CH(CH3)2 | —CH₃ |
| 86A | —CH(CH3)2 | —OCH₃ | —OCH₃ | —CH(CH3)2 |
| 87A | —CH(CH3)2 | —OCH₃ | —CH(CH3)2 | —OCH₃ |

TABLE 1-continued

| # | R1 | R3 | R5 | R7 |
|---|---|---|---|---|
| 88A | —OCH₃ | —CH(CH3)2 | —OCH₃ | —CH(CH3)2 |
| 89A | —OCH₃ | —CH(CH3)2 | —CH(CH3)2 | —OCH₃ |
| 90A | cyclohexyl | cyclohexyl | cyclohexyl | cyclohexyl |
| 91A | cyclohexyl | —H | —H | cyclohexyl |
| 92A | cyclohexyl | —H | cyclohexyl | —H |
| 93A | —H | cyclohexyl | —H | cyclohexyl |
| 94A | —H | cyclohexyl | cyclohexyl | —H |
| 95A | cyclohexyl | —CH₃ | —CH₃ | cyclohexyl |
| 96A | cyclohexyl | —CH₃ | cyclohexyl | —CH₃ |
| 97A | —CH₃ | cyclohexyl | —CH₃ | cyclohexyl |
| 98A | —CH₃ | cyclohexyl | cyclohexyl | —CH₃ |
| 99A | cyclohexyl | —OCH₃ | —OCH₃ | cyclohexyl |
| 100A | cyclohexyl | —OCH₃ | cyclohexyl | —OCH₃ |
| 101A | —OCH₃ | cyclohexyl | —OCH₃ | cyclohexyl |
| 102A | —OCH₃ | cyclohexyl | cyclohexyl | —OCH₃ |

TABLE 2

| # | R14 | R15 | X1 | X2 |
|---|---|---|---|---|
| 1B | —CN | —H | —F | —F |
| 2B | —CN | —H | —CN | —CN |
| 3B | —CN | —H | —F | —CN |
| 4B | —CN | —H | —NO₂ | —NO₂ |
| 5B | —CN | —H | —CO₂CH₃ | —CO₂CH₃ |
| 6B | —CN | —H | —OCOCH₃ | —OCOCH₃ |
| 7B | —CN | —H | —CF₃ | —CF₃ |
| 9B | —CN | —H | —OCH₃ | —OCH₃ |
| 10B | —CN | —H | —OC₆H₅ | —OC₆H₅ |

TABLE 3

| # | R13 |
|---|---|
| 1C | —H |
| 2C | —CN (ortho) |
| 3C | —CN (meta) |
| 4C | —CN (para) |
| 5C | —F (ortho) |
| 6C | —F (meta) |
| 7C | —F (para) |
| 8C | —NO₂ (ortho) |

TABLE 3-continued

| # | R13 |
|---|---|
| 9C | —NO₂ (meta) |
| 10C | —NO₂ (para) |
| 11C | —CO₂CH₃ (ortho) |
| 12C | —CO₂CH₃ (meta) |
| 13C | —CO₂CH₃ (para) |
| 14C | —OMe (ortho) |
| 15C | —OMe (meta) |
| 16C | —OMe (para) |
| 17C | 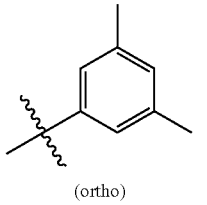 [SMILES: *c1cc(C)cc(C)c1] (ortho) |
| 18C | 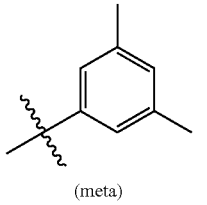 [SMILES: *c1cc(C)cc(C)c1] (meta) |
| 19C | 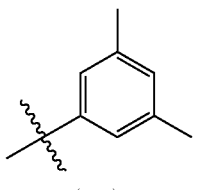 (para) |
| 20C | 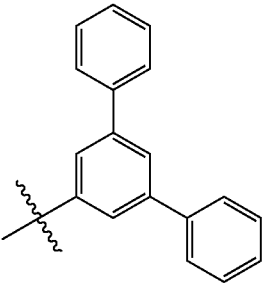 (ortho) |
| 21C | 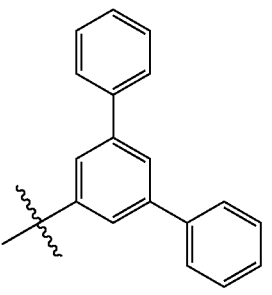 (meta) |
| 22C | 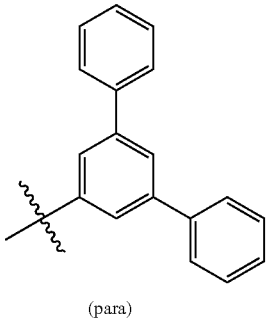 [SMILES: *c1cc(-c2ccccc2)cc(-c2ccccc2)c1] (para) |
| 23C | (ortho) |
| 24C | (meta) |
| 25C | 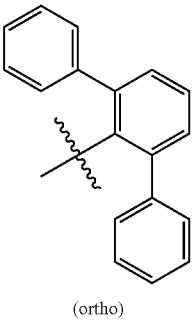 [SMILES: *c1c(-c2ccccc2)cccc1-c1ccccc1] (para) |

5. A color conversion film comprising:
   a resin matrix; and
   the compound of claim 1 dispersed into the resin matrix.

6. A backlight unit comprising the color conversion film of claim 5.

7. A display apparatus comprising the backlight unit of claim 6.

8. The compound of claim 1, wherein each of R1 to R8 is a phenyl group.

9. The color conversion film of claim 5, the film comprises the compound in a range of 0.001% by weight to 10% by weight based on the total weight of the film.

10. The color conversion film of claim 5, wherein the resin matrix comprises a thermoplastic polymer or a thermocurable polymer.

11. The color conversion film of claim 5, wherein a thickness of the film is 2 um to 200 um.

* * * * *